United States Patent [19]

Kiehart

[11] Patent Number: 4,785,922
[45] Date of Patent: Nov. 22, 1988

[54] GUN RECOIL MECHANISM

[76] Inventor: Lawrence R. Kiehart, 122 Lake Breeze Cir., Marblehead, Ohio 43440

[21] Appl. No.: 103,941

[22] Filed: Oct. 2, 1987

[51] Int. Cl.$^4$ .............................................. F16F 9/34
[52] U.S. Cl. ................... 188/316; 188/281; 188/322.18; 277/116.4; 277/190
[58] Field of Search ............... 188/316, 317, 322.15, 188/322.18, 281, 282; 267/127; 227/119, 120, 116.2, 116.4, 116.8, 190

[56] References Cited

U.S. PATENT DOCUMENTS

| | | | |
|---|---|---|---|
| 2,417,504 | 3/1947 | Knaggs et al. | 188/316 X |
| 3,108,661 | 10/1963 | Flick | 188/316 X |
| 3,990,548 | 11/1976 | Schupner | 188/322.15 X |

FOREIGN PATENT DOCUMENTS

| | | | |
|---|---|---|---|
| 083043 | 6/1954 | France | 188/317 |
| 22044 | 6/1915 | United Kingdom | 188/322.18 |

Primary Examiner—George E. A. Halvosa
Attorney, Agent, or Firm—Pearne, Gordon, McCoy & Granger

[57] ABSTRACT

A constant-pressure hydraulic shock-absorbing device suitable for use as a recoil brake in a weapon system. By use of a piston that decreases in diameter as the applied force increases, a constant resistive force independent of the applied force is obtained. The varying diameter of the piston creates a varying aperture for the displacement of fluid by the piston, thus varying the resistive force. This results in minimum travel and/or minimum/maximum force transmitted through the shock absorber for a given applied energy.

2 Claims, 6 Drawing Sheets

GUN RECOIL MECHANISM

BACKGROUND OF THE INVENTION

The present invention relates to constant-pressure hydraulic shock absorbing devices. In particular, the invention may be used to absorb the recoil energy generated in the firing of a gun or other recoiling weapon.

A typical hydraulic shock absorber, consisting of a movable piston in a fluid-filled cylinder, will supply a resisting force that increases with the speed of movement of the piston. Thus, if the external force applied to the piston is impulsive, the resisting force is also highly impulsive.

As is well-known, the integral of the force of resistance over the distance traveled is equal to the energy absorbed. Given a maximum allowable force, it is therefore desirable to maintain that maximum force over the entire distance in order to minimize the distance necessary to absorb a given energy. This is not achieved if the resisting force is instead impulsive in nature.

With an impulsive resisting force, either the distance of travel is longer than necessary or the maximum force is higher than necessary for a given energy to be absorbed. If the available space for travel is limited, this may necessitate unacceptably high forces being transmitted to the shock absorber mount and/or significant structural penalties necessary to handle the higher forces.

Various means have been used to try to make the resisting force constant for a large range of external force. Most involve varying the effective aperture between the high and low-pressure sides of the piston as a function of the position of the piston in its range of travel. Others have used complicated external pressure regulating means to achieve a constant pressure.

The firing of a gun creates a well-known recoil force in the direction opposite to that of the fired projectile. This force is highly impulsive in nature. In a confined area such as a turret, limited recoil space is available. If optimum use of the available space is not made, excessive forces may occur and greater structural strength may be necessary.

Recoil absorbers have been used that vary the resistive force as a function of piston position. Tied to the geometry of the system rather than the actual forces, this method does not provide the needed flexiblity for the differing recoil characteristics of various weapon rounds.

The mechanism of the present invention resolves the difficulties described above and affords other features and advantages heretofore not obtainable.

SUMMARY OF THE INVENTION

The present invention comprises a new and improved self-contained, constant-pressure, hydraulic shock absorbing system. The pressure is continuously regulated, rather than being a function of the position of the recoil mechanism.

According to one aspect of the invention, the shock absorber device minimizes the absorbing distance for a given maximum allowable resistive force.

According to another aspect, the shock absorber device provides a constant resistive force independent of the force applied, thereby minimizing the peak resistive force.

According to another aspect of the invention, a gun recoil mechanism minimizes the travel required to absorb the recoil energy created when the gun is fired.

According to another aspect of the invention, when the gun is fired, the recoil force transmitted to the gun mount is minimized.

These and other aspects and advantages of the invention will be more fully understood from the following description in view of the accompanying drawings.

DESCRIPTION OF THE PREFERRED EMBODIMENT

Figure 1:
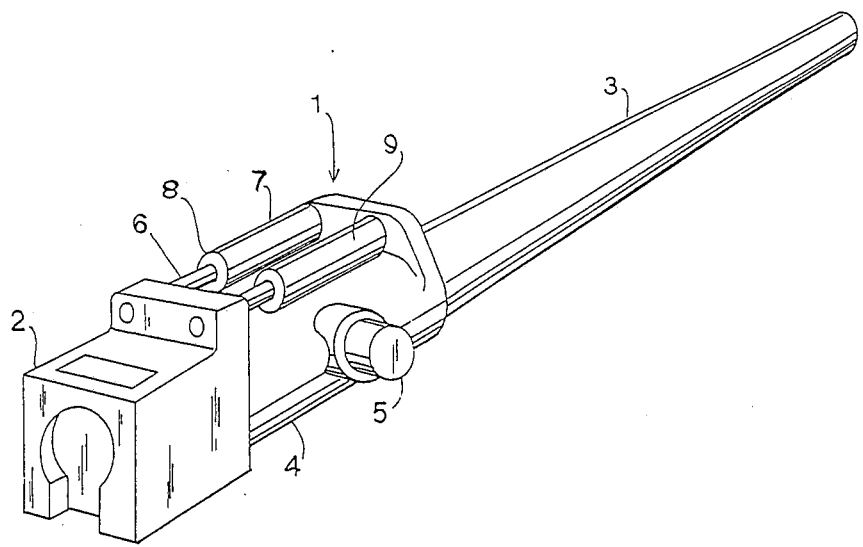
FIG. 1 is a perspective view of a gun utilizing a recoil mechanism embodying the invention.

Referring more particularly to the drawings, and initially to FIG. 1, there is shown a gun assembly 1 with a breech 2 attached to a barrel 3 which is slidably mounted in a cradle 4. The gun assembly is mounted by trunnions 5 on opposite sides of the cradle. The assembly 1 includes a rod 6 and cylinder 7 that cooperatively function as a shock absorber 8. The rod 6 could be conveniently attached to the breech 3 and the cylinder 7 attached to the cradle 4. Recoil energies created by the firing of the gun are absorbed by the shock absorber 8 by resisting, through rod 6 and cylinder 7, as described hereinafter, the sliding movement in cradle 4 of the barrel 3 and breech 2 combination in the direction of breech 2. A counterrecoil cylinder 9, which will not be further described, returns the barrel 3 to the original position.

Figure 2:
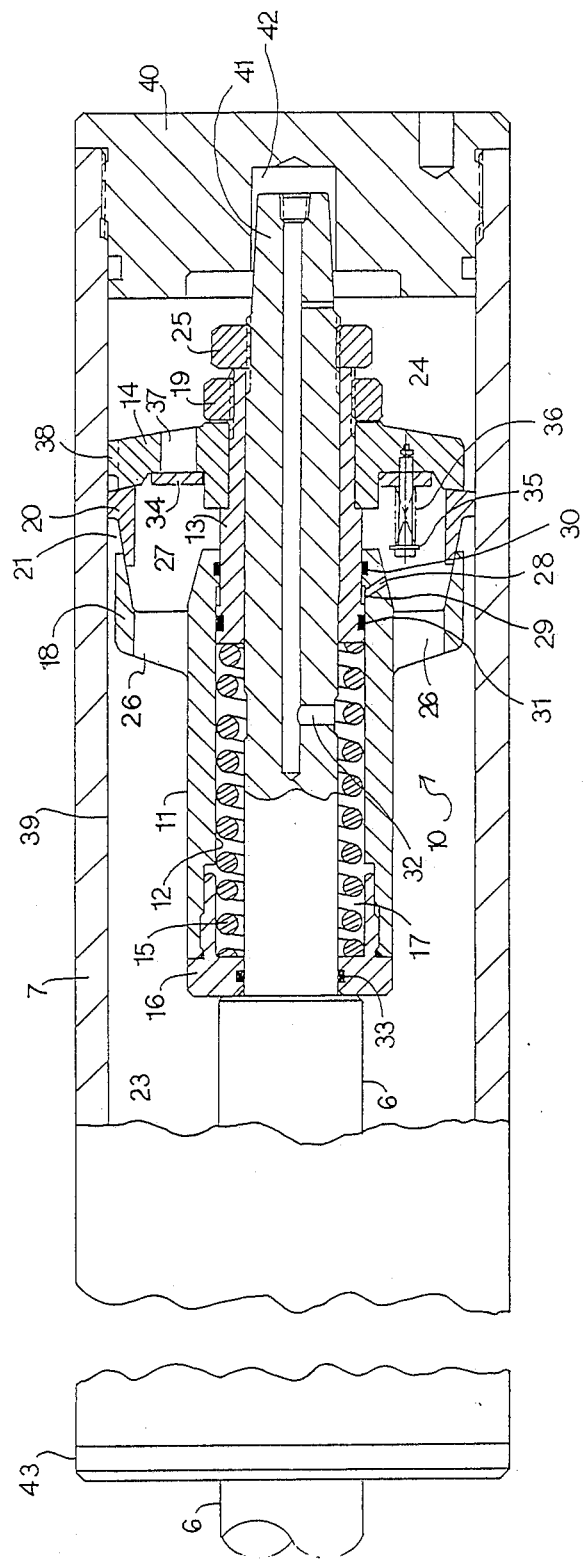
FIG. 2 is a broken side elevation of the recoil cylinder and piston assembly used in the recoil mechanism of FIG. 1 and shown in the ready position, will parts broken away and shown in section for the purpose of illustration.

Referring to FIG. 2, the shock absorber 8 includes cylinder 7 containing a piston assembly 10 attached to rod 6.

The piston assembly 10 includes an actuator cup 11 with a substantially cylindrical bore 12 that slidably retains a backup cup sleeve 13 subject to an axial force toward a backup cup 14. This force is provided by an actuator return spring 15 held in compression between sleeve 13 and an actuator cap 16. In the preferred embodiment, the actuator cap 16 is threaded into actuator cup 11 to define a spring chamber 17. The actuator cup 11 is provided with an actuator lip 18 consisting of an annular region of gradually increasing inner diameter toward backup cup 14. The backup cup 14 is retained on sleeve 13 by the threaded backup cup retainer nut 19.

A split piston ring 20 is held between actuator cup 11 and backup cup 14. The ring 20 is provided with a piston ring shoulder 21 consisting of a substantially annular region of gradually decreasing outer diameter toward the actuator cup 11.

The change in diameter of the shoulder 21 matches the change in diameter of the actuator lip 18 such that the lip 18 and shoulder 21 form mutualsliding, camming surfaces whereby piston ring 20 is radially compressed by movement of actuator cup 11 toward backup cup 14.

Figure 3:
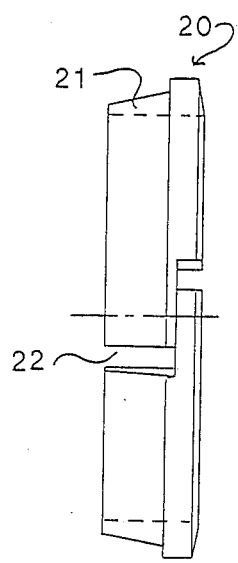
FIG. 3 is a side elevation view of the piston ring of FIG. 2, showing the piston ring shoulder and expansion notch.

Referring to FIG. 3, expansion notch 22 is formed by the split ends of piston ring 20 to allow the expansion and contraction of the diameter and circumference of ring 20.

Continuing to view FIG. 2, the piston assembly 10 divides the interior of cylinder 7 into a high-pressure region 23 on the actuator-cup side and a low-pressure region 24 on the backup-cup side of the assembly 10. The piston assembly 10 is retained on rod 6 by threaded piston retaining nut 25 which secures sleeve 13 in a press-fit manner on rod 6.

Figure 4:
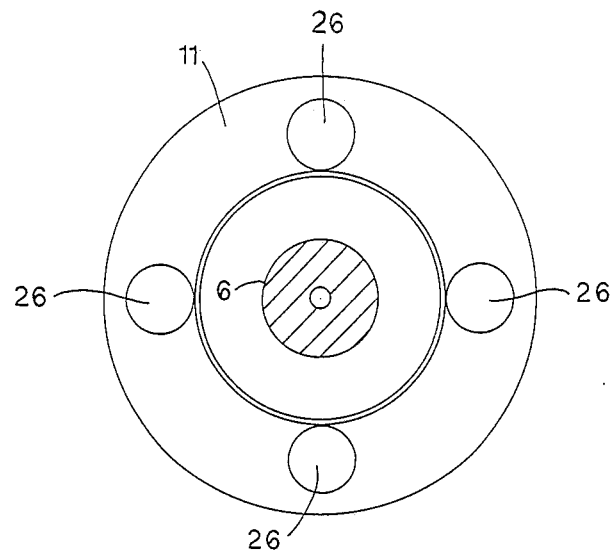
FIG. 4 is a cross section along line 5—5 of FIG. 6 useful for showing the ports in the actuator cup that communicate between the interior and exterior of the actuator cup.

Actuator ports 26 (see FIG. 4) communicate between the high-pressure region 23 and the largely annular piston interior 27 of piston assembly 10 defined by actuator cup 11, piston ring 20, backup cup 14 and sleeve 13.

A pressure port 28 in actuator cup 11 communicates between the piston interior 27 and an annular pressure chamber 29 formed as shown between backup cup sleeve 13 and actuator cup 11. The pressure chamber 29 is slidably sealed by an annular actuator seal 30 and an annular sleeve seal 31.

A vent passage 32 communicates between spring chamber 17 and the low-pressure region 24. The rod 6 is slidably sealed in the bore 12 by seal rings 30 and 33.

Figure 5:
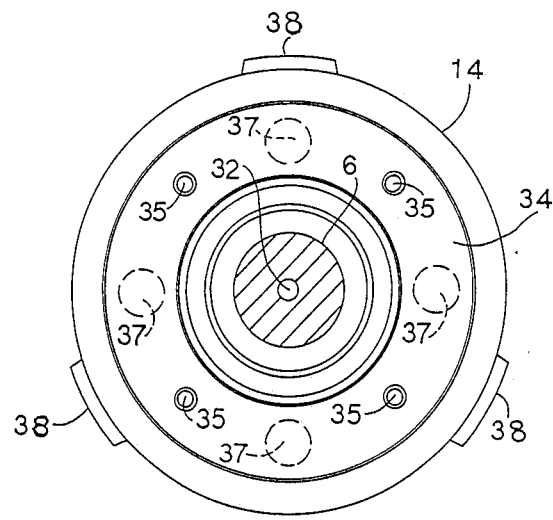
FIG. 5 is a cross section along line 6—6 of FIG. 6 useful for showing the check valve ring and guide pins and the centering lugs on the backup cup.

As shown in FIGS. 2 and 5, a check valve ring 34 is slidably mounted on guide pins 35 attached to backup cup 14. The ring 34 is axially urged by check valve springs 36 compressively retained on guide pins 35 to sealingly cover check valve ports 37 that communicate between piston interior 27 and low-pressure region 24. Lugs 38 on backup cup 14 extend radially toward the cylinder wall 39 and generally center the piston assembly 10 radially in cylinder 7.

As shown in FIG. 2, cylinder end cap 40 seals the backup cup 14 end of cylinder 7. The rod 6 is provided with a generally conical tapered rod extension 41 that acts with cylindrical cavity 42 in cap 40 to form a dashpot.

Figure 6:
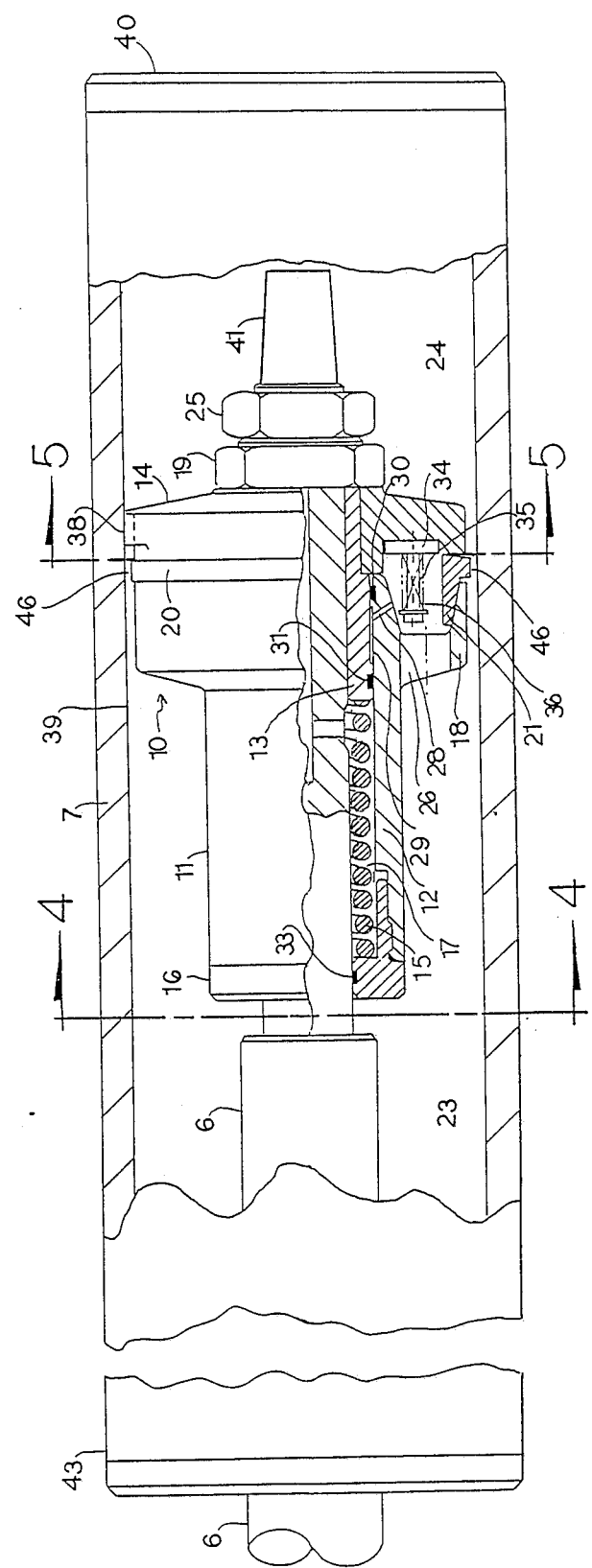
FIG. 6 is a broken side elevation showing the piston ring contracted away from the cylinder wall as a result of the piston being in motion toward the left, with parts broken away and shown in section for the purpose of illustration.

Turning to FIG. 6, a gland 43 substantially closes the cylinder 7 between rod 6 and cylinder 7 at the rod end. The rod 6 is slidably positioned within the gland 43 and the high-pressure region 23 is further sealed by an annular gland gasket 44. An annular accumulator sponge 45 is mounted to cylinder wall 39, abutting gland 43.

Returning to FIG. 2, when an axial force, such as the recoil force of a gun (as in the configuration shown in FIG. 1), is applied to rod 6 toward the left, rod 6 and piston assembly 10 attempt to move to the left also. As is well-known, this estabilishes a high pressure in the region 23 of the cylinder 7 as the piston assembly 10 attempts to displace the hydraulic fluid in the cylinder.

Initially, there is essentially no passageway between high-pressure region 23 and low-pressure region 24, as piston ring 20 is expanded essentially to the circumference of cylinder wall 39 and check valve ports 37 are covered by ring 34 held against the ports by springs 36. However, the high pressure in region 23 is communicated to the interior 27 of the piston assembly 10 through actuator ports 26. The high pressure therein is then communicated through pressure port 28 to pressure chamber 29. Meanwhile, low-pressure fluid in region 24 is communicated through vent passage 32 to spring chamber 17.

In conjunction with chamber 29, bore 12 and sleeve 13 constitute a piston and cylinder combination. Sufficient pressure differential between pressure chamber 29 and spring chamber 17 acts in opposition to spring 15 to axially slide actuator cup 11 on sleeve 13 toward backup cup 14.

As shown in FIG. 6, movement of actuator cup 11 toward back up cup 14 causes a camming action between lip 18 and shoulder 21 as piston ring 20 is held between cups 11 and 14. Expansion notch 22 shown in FIG. 3 allows this camming action to compress the circumference of piston ring 20. This results in an annular aperture 46 between the compressed ring 20 and cylinder wall 39. The inner radius of aperture 46 is proportional to the amount of movement by actuator cup 11 toward backup cup 14, which is in turn proportional to the pressure differential between pressure chamber 29 and spring chamber 17.

Aperture 46 provides a passage for the displacement of hydraulic fluid between high-pressure region 23 and low-pressure region 24, thus allowing the piston assembly 10 and rod 6 to move in the direction of the applied force. As is well-known, movement of a piston in a fluid-filled cylinder is opposed by a force proportional to the effective aperture available for the displacement of the fluid. Aperture 46 is variable depending on the pressure differential between pressure chamber 29 and spring chamber 18, as the distance between cups 11 and 14 determines the circumference of ring 20. This varying of aperture 46 as a function of the pressure differential between regions 23 and 24 allows the invention to maintain a constant force in opposition to the applied external force.

Figure 7:
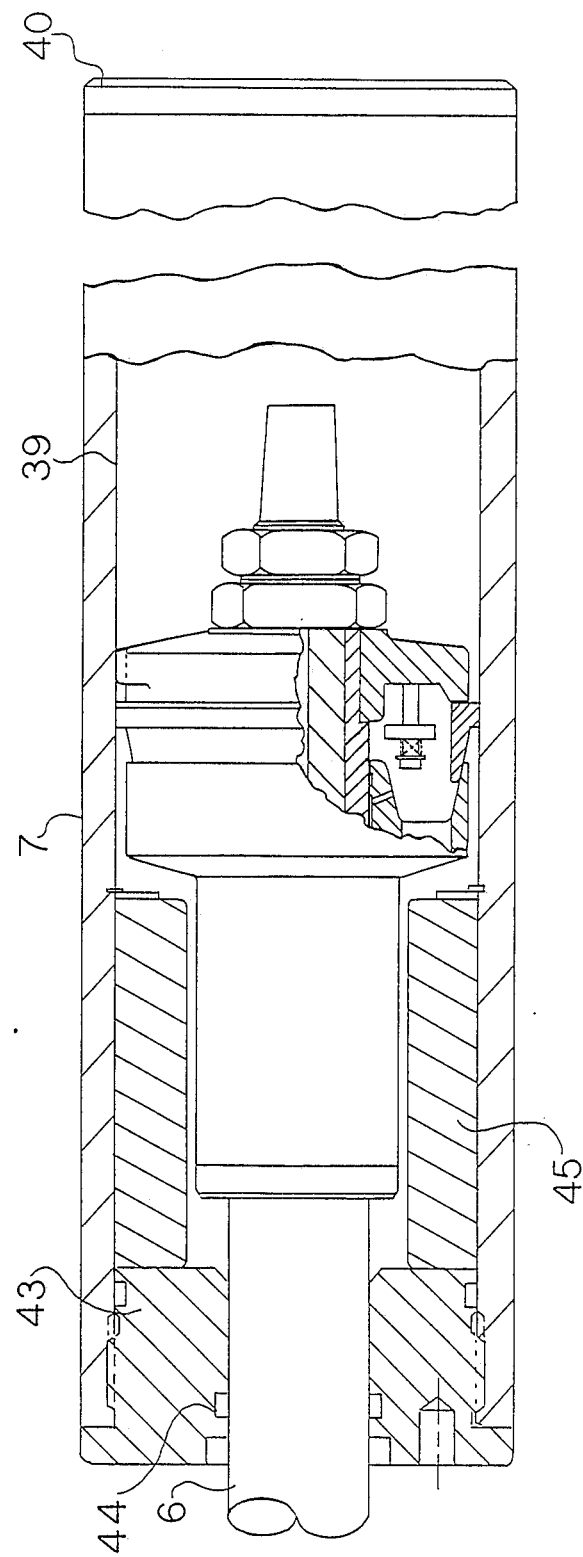
FIG. 7 is a broken side elevation showing the check valve in the open position during return of the piston assembly to the ready position from the shown end-of-travel position, with parts broken away and shown in section for the purpose of illustration.

Referring to FIG. 7, the piston assembly 10 is shown starting to return to its initial position (FIG. 2) after a shock-absorbing stroke. Aperture 46 is no longer present absent high pressure in pressure chamber 29 and external means apply an axial force to the right on rod 6. This creates a high pressure in former low-pressure region 24, thereby forcing check valve ring 34 away from check valve ports 37, overcoming the closing force of springs 36. This allows a low constriction path for displacement of the fluid from region 24 to region 23 through ports 26 and 37. Accumulator sponge 45 is provided to compensate for internal volumetric changes caused by ingress and egress of the rod 6 from cylinder 7.

Referring to FIG. 2, the motion of returning rod 6 and piston assembly 10 is cushioned by the dashpot-line action of rod extension 41 entering cavity 42.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a hydraulic shock-absorbing device including a fluid cylinder, a piston adapted for reciprocating movement in the cylinder to include a shock-absorbing extension stroke caused by an impulsive force and a retraction stroke, the piston dividing the interior of the cylinder into a high-pressure chamber toward which the piston moves during the extension stroke, and a low-pressure chamber on the opposite side of the piston, the improvement which comprises:

an annular cylindrical member carried by said piston to define with the inner wall of said fluid cylinder, an annular fluid bypass space, said annular member having a discontinuous ring with interfitting end portions and with a cylindrical bypass passage-defining surface portion and an adjacent frustoconical exterior surface portion of smaller diameter than the pass-defining surface portion, said annular member being capable of radial expansion and contraction to vary the size of said bypass space;

means biasing the annular member toward radial expansion;

means responsive to a fluid pressure increase in said high-pressure chamber caused by the impulsive force for radially contracting the annular member to increase the size of the annular bypass space an amount representative of the magnitude of the pressure increase, said means for radially contracting the annular member having a first piston element engaging said ring on one axial end thereof, a second piston element axially movable relative to said first piston element and engaging said ring on the other axial end thereof, one of said piston elements having a frustoconical interior surface portion that operatively engages said exterior frustoconical surface portion of said ring, whereby relative axial movement of said first and second piston elements toward one another cams said frustoconical surface in a manner that contracts said ring and enlarges the bypass space, and means for transmitting fluid pressure from said high-pressure chamber to said piston elements in a manner urging said elements axially toward one another;

whereby the fluid pressure in the high-pressure chamber remains relatively constant during the extension stroke of the piston.

2. A shock-absorbing device as defined in claim 1, wherein said piston elements have cylindrical telescopically engaging interior and exterior surface portions respectively capable of relative axial movement, and which define therebetween an annular chamber of an axial length that varies with relative axial movement so as to increase in axial length when said piston elements move axially toward one another and a portion communicating between said annular chamber and said high-pressure chamber.

\* \* \* \* \*